(No Model.)
E. C. HAYDE.
VEHICLE WHEEL.
No. 605,875. Patented June 21, 1898.
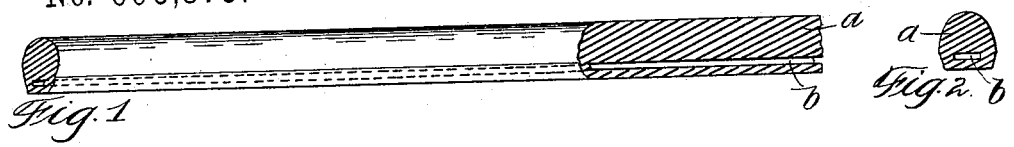
Fig. 1. Fig. 2.
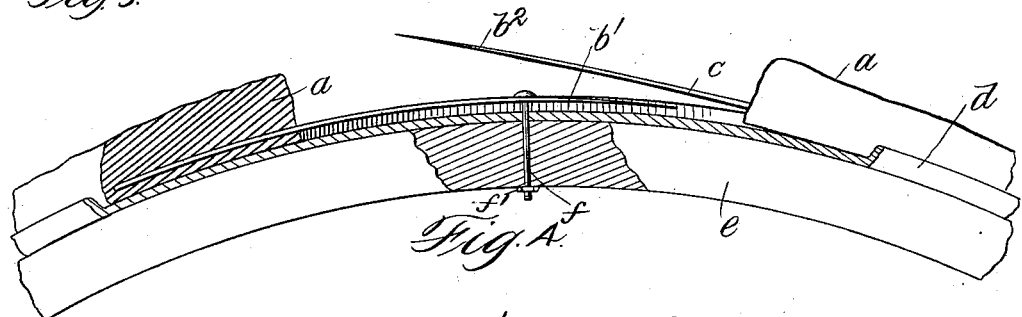
Fig. 3.
Fig. 4.
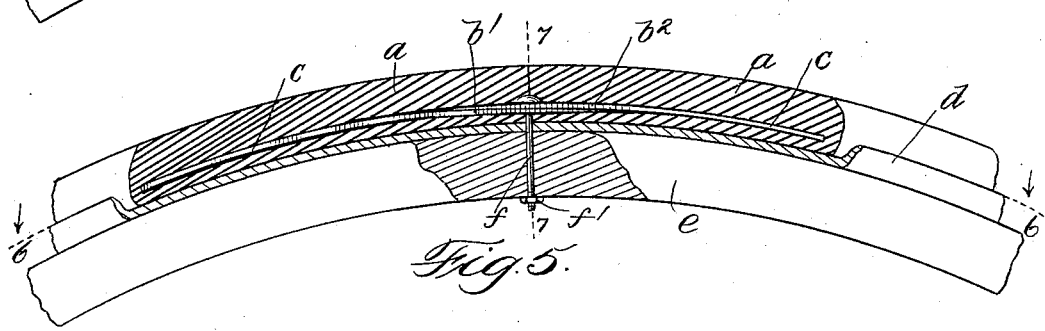
Fig. 5.
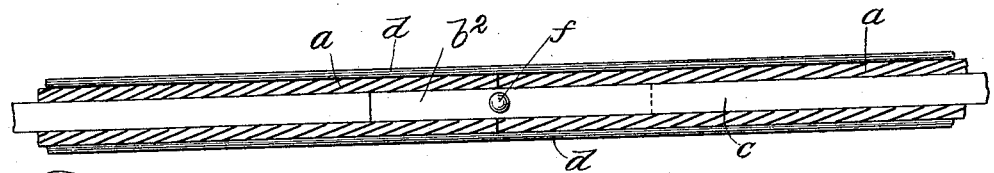
Fig. 6.
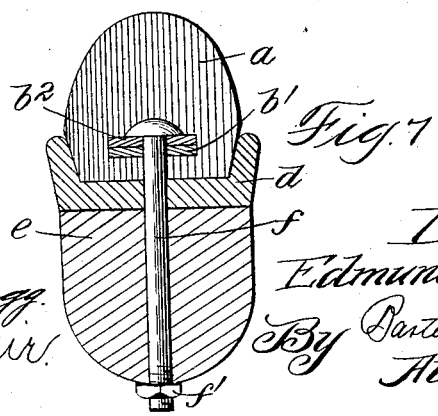
Fig. 7.
Witnesses
George L. Cragg
John W. Sinclair
Inventor:
Edmund C. Hayde
By Barton & Brown
Attorneys.
THE NORRIS PETERS CO., PHOTO-LITHO., WASHINGTON, D. C.

UNITED STATES PATENT OFFICE.

EDMUND C. HAYDE, OF CHICAGO, ILLINOIS.

VEHICLE-WHEEL.

SPECIFICATION forming part of Letters Patent No. 605,875, dated June 21, 1898.

Application filed February 26, 1897. Serial No. 625,109. (No model.)

*To all whom it may concern:*

Be it known that I, EDMUND C. HAYDE, a citizen of the United States, residing at Chicago, in the county of Cook and State of Illinois, have invented a certain new and useful Improvement in Vehicle-Wheels, of which the following is a full, clear, concise, and exact description, reference being had to the accompanying drawings, forming a part of this specification.

My invention relates to vehicles, and particularly to those vehicles in which resilient tires are employed upon the wheels, and has for its object an improved means for securing tires in position upon the rims or fellies of wheels.

My invention is particularly applicable to securing cushion-tires in position upon the rims of carriage-wheels.

Prior to my invention cushion-tires were secured to the rims of the wheels of vehicles in different ways. The prior art is exemplified in British Patent No. 13,493 of 1892 to Sterckz and in American Patent No. 571,872, of November 24, 1896, to A. M. Williamson for tire-fastening. Neither of the forms of securing the tires mentioned in the said patents has found favor.

It is evident that in attempting to secure tires, as illustrated in the Sterckz British patent, there would be no means for tightly drawing the tire about the rim and adjusting the length of the same to the interior band and the rim while the tire is in place upon the rim, as is desirable.

In the Williamson tire-fastening device a loop-bolt is employed in combination with a rod, the loop of the bolt passing through holes in the abutting ends of the rod, no adjustment being provided between the said rod, which passes through the elastic tire, and the said tire and rim.

By the use of my invention I am enabled to readily adjust the length of the band to securely clamp the tire in position, thereby adjusting the clamping action of the band upon the underlying portion of the tire—that is to say, the portion of the tire which comes between the band and the channel-rim. The cushion-tire is molded and provided with an opening or channel, through which is inserted the retaining-band, conforming in shape to the said opening. The ends of the band overlap one another when in place and are secured in position to tightly compress the inner portion of the tire against the channel-rim.

There is found variation in the consistency or elasticity of rubber or cushion tires, especially in that portion between the retaining-band and the channel-rim. Hence there is special advantage in providing for special adjustment of the length of the retaining-band by overlapping the ends thereof more or less, as may be required by the particular tire which is secured in place. This I accomplish by actually placing the tire upon the wheel and overlapping the ends of the band the right distance after determining its position before the last hole in the ends of the overlapping band is drilled. In carrying out this plan of construction I bring the overlapping ends of the retaining-band in position to cause the hole which has been previously drilled in one of the ends of the band to practically register with the plane of the abutting ends of the tire, so that the ends of the tire may be pressed back and clamped to afford room for drawing the retaining-band together into the position desired, after which the hole in the unpierced end of the retaining-band is formed and the bolt inserted, as will be more particularly explained.

I will explain my invention more particularly by reference to the accompanying drawings, in which—

Figure 1 is an elevation, partially in section, of a cushion-tire which is constructed in a manner to permit of its mounting upon a wheel by means of a band of metal in accordance with my invention. Fig. 2 is a view in cross-section thereof. Fig. 3 is a view similar to Fig. 1 with the retaining-band in place within the tire. Fig. 4 is an elevation of a segment of the wheel, partially in section, showing the means which I prefer to employ for uniting the ends of the retaining-band. In this view the union between the ends of the retaining-band is not complete. Fig. 5 is a view similar to Fig. 4 with the union between the ends of the retaining-band complete. Fig. 6 is a sectional plan view on line 6 6 of Fig. 5. Fig. 7 is an enlarged cross-sectional view taken on line 7 7 of Fig. 5.

Similar letters of reference refer to like parts throughout the different views.

In practicing my invention I mold the cushion-tire $a$ with a channel $b$ of rectangular or flat cross-section, through which is passed a retaining-band $c$ of corresponding cross-section. I mount a channel-rim $d$, which is preferably of the shape shown more clearly in Fig. 7, upon the outer periphery of the felly or rim $e$. The rim $d$ is preferably formed of channel-iron. After the retaining-band $c$ has been disposed within the tire I place the tire within the groove in the channel-rim and secure one end $b'$ of the retaining-band to the rim of the wheel by passing a bolt $f$ through a hole previously formed in the end $b'$ of the retaining-band and alined holes formed through the channel-rim and felly. The end of the tire encircling the end $b'$ of the retaining-band is pressed backwardly, as is also the end encircling the opposite end $b^2$ of the retaining-band, for the purpose of gaining access to the ends of the retaining-band to manipulate the same. After the one end of the retaining-band has been thus anchored the other end is grasped by a suitable appliance and drawn as tightly as is practicable toward the anchored end of the band, whereupon the ends of the band are temporarily secured in position by suitable clamping devices. A hole is then drilled in the end $b^2$ in alinement with the holes through the end $b'$, channel-rim $d$, and felly $e$. The bolt $f$, which may have been previously removed, is now passed through each of the holes formed in the overlapping ends of the retaining-band, rim $d$, and felly $e$, and then secured in place by nut $f'$. The temporary clamping devices which were previously applied to the ends $b'$ $b^2$ of the retaining-band are then removed and the abutting ends of the tire are allowed to come in contact, as shown in Fig. 5.

By particular reference to Fig. 7 it will be seen that the retaining-band is confined below the outer peripheries of the side walls of the channel-rim, so that the relative side motion of the retaining-band is extremely limited. The overlapping ends of the retaining-band are preferably tapered, as shown.

By mounting tires upon wheels in accordance with my invention I am enabled to prevent the tire from becoming worn or cut, and I am enabled to so firmly secure the tire in position as to prevent the accidental removal thereof while the vehicle is in travel.

By the means which I employ for securing the tire in position the tire may be readily removed whenever desired with but slight effort.

Having thus described my invention, what I claim as new, and desire to secure by Letters Patent, is—

The combination with the channel-rim of a vehicle-wheel, of an elastic or cushion tire, said elastic tire being provided with an opening through which a retaining-band having overlapping ends is inserted, the overlapping ends of said band being pierced to receive a bolt inserted through an opening in the rim of the wheel registering therewith and in the plane of the abutting ends of the elastic tire, said tire being adapted to be drawn back to afford access to the overlapping ends of the retaining-band for adjusting the position thereof and thereby the clamping action of the band upon the portion of the tire which is compressed between the said band and the channel-rim, and permitting the piercing of one of the overlapping ends of the retaining-band after such adjustment has been made, whereby the tire is independently adjusted and secured in position upon the wheel with the desired force or clamping action, substantially as and for the purpose specified.

In witness whereof I hereunto subscribe my name this 24th day of February, A. D. 1897.

EDMUND C. HAYDE.

Witnesses:
CHARLES A. BROWN,
JOHN W. SINCLAIR.